United States Patent [19]

Fette

[11] 4,383,287
[45] May 10, 1983

[54] PHOTOGRAPHY LIGHTING SYSTEM

[76] Inventor: Frank E. Fette, 1006 Oakridge Dr., Jackson, Mich. 49203

[21] Appl. No.: 299,404

[22] Filed: Sep. 4, 1981

[51] Int. Cl.³ .......................................... G03B 15/03
[52] U.S. Cl. ...................................... 362/18; 352/49; 352/53; 362/67; 362/220; 362/190
[58] Field of Search .................... 362/18, 66, 67, 217, 362/220, 190; 352/49, 53, 89; 354/293

[56] References Cited

U.S. PATENT DOCUMENTS

| 2,649,835 | 8/1953 | Lierley | 352/89 |
| 2,860,561 | 11/1958 | Pennington | 355/80 |
| 3,158,478 | 11/1964 | Eaton et al. | 355/80 |
| 3,378,678 | 4/1968 | De Groff | 362/5 |
| 3,670,156 | 6/1972 | Schmidt | 362/220 |
| 4,233,647 | 11/1980 | Andersen | 362/18 |

FOREIGN PATENT DOCUMENTS 2831424 1/1980 Fed. Rep. of Germany ........ 362/18

Primary Examiner—Irwin Gluck
Attorney, Agent, or Firm—Beaman & Beaman

[57] ABSTRACT

The invention pertains to a method and apparatus for illuminating a subject to be photographed wherein the subject is illuminated in such a manner that a uniform highlight is produced upon reflective surface, substantially uniform illumination of the subject is achieved at front and lateral areas, and the background may be modified to lower the background contrast, and if desired, the background may be removed completely. A light source of elongated configuration produces a uniform light source of a vertical dimension greater than the vertical dimension of the subject being photographed. The light source is translated across the subject matter at a predetermined uniform rate while the camera aperture is open while photographing the front and lateral portions of the subject illuminated by the light source. The passing of the light source behind the subject lowers the contrast of the existing background, and such contrast may be sufficient to remove the background completely, if desired. Apparatus for supporting and translating the light source may include a permanent mounting wherein the light source revolves in a circle, or the light source may be mounted upon a portable platform driven by a constant speed motor for producing a uniform displacement of the light source.

11 Claims, 10 Drawing Figures

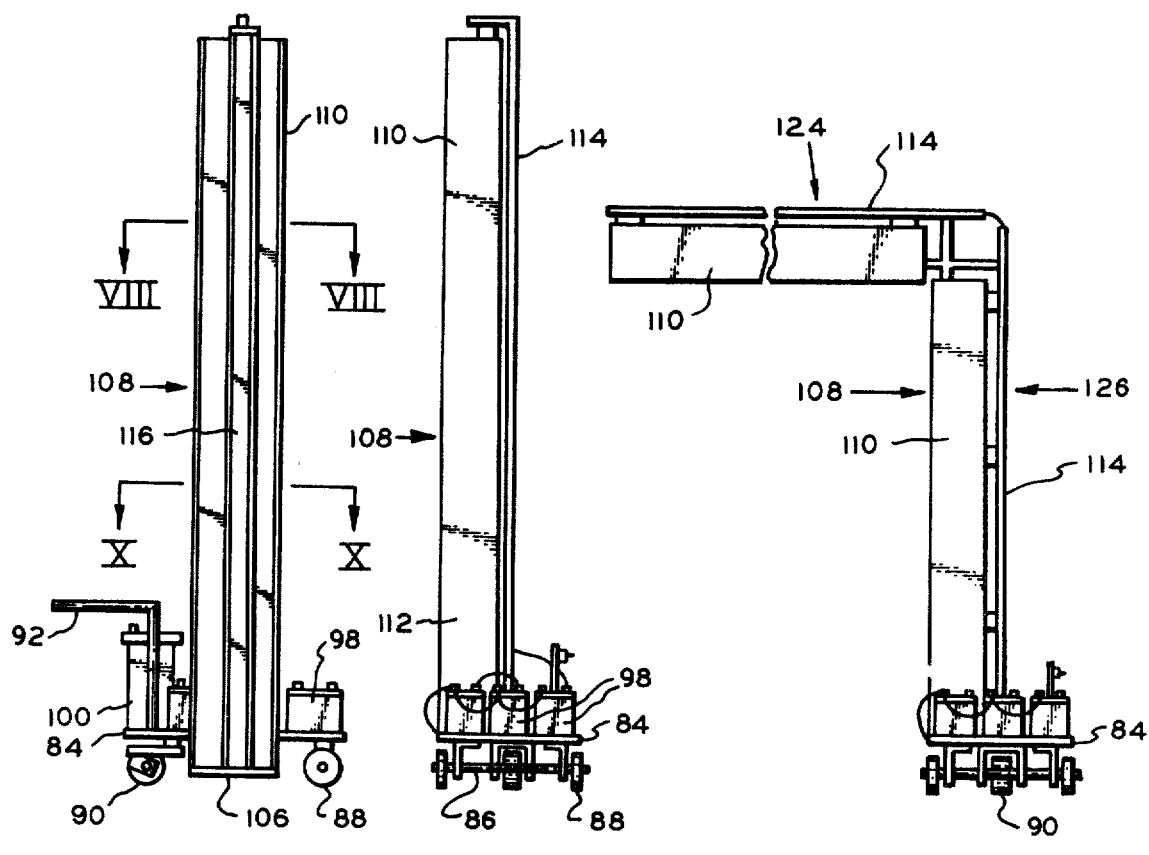
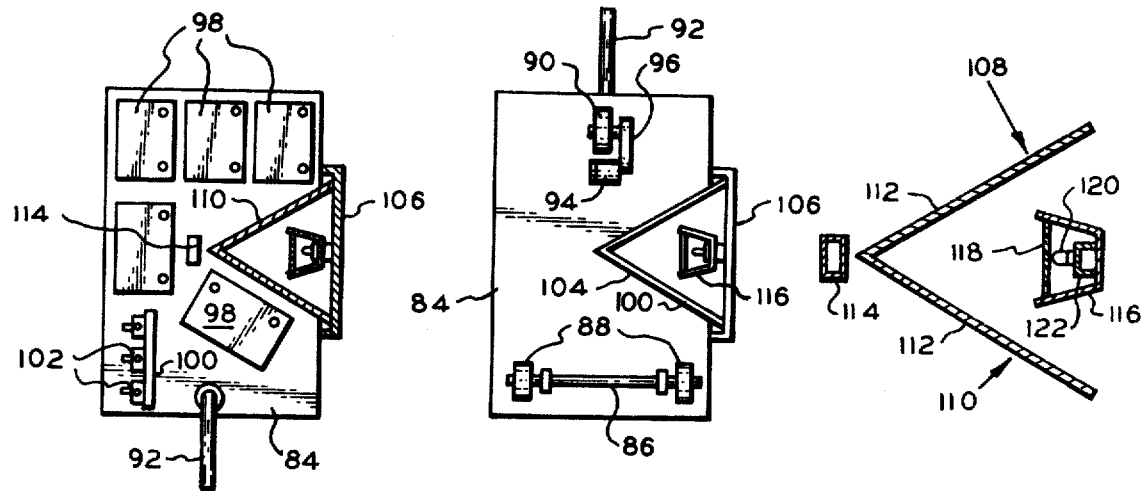

PHOTOGRAPHY LIGHTING SYSTEM

BACKGROUND OF THE INVENTION

The proper illumination of a subject being photographed is most important in the production of high quality photography, and photographers utilize a wide variety of lighting devices in achieving the desired illumination. Artificial illumination includes direct lighting, indirect lighting, and a variety of light reflectors, flash units, windows, and other light sources are employed to achieve the desired result. Usually, the light source is stationary with respect to the subject being photographed and the camera during exposure of the film, and the intensity of the illumination, the distance of the illuminating devices from the subject, the reflective quality of the subject, the aperture or diaphragm setting of the camera, and the lens to be used, all affect the illumination characteristics with respect to the end result achieved, and photographers often go to great lengths to achieve the desired lighting effect.

As the source of illumination during photography is normally fixed, shadows may result when photographing three dimensional subjects, and a variety of techniques are utilized to eliminate or control shadows to enhance the photograph, or emphasize the shape and configuration of the subject.

A plurality of lamps are usually required to uniformly illuminate subject matter of complex form. For instance, when photographing a relatively large machine tool, automobile, or other item of complex configuration a great number of lamps are utilized to control shadows and produce the desired effect. Considerable time and expense is involved in setting up the lighting equipment when photographing complex three-dimensional subjects, and even with care it is often difficult to control the illumination intensity and location to the extend desired.

It is known to employ a moving light source when photographing a stationary subject, and a shielded light held in the hand of the photographer has been employed to illuminate the subject while in the dark wherein the photographer using a painting motion washes the light upon the subject while the camera aperture is open to minimize uneven illumination, and such illumination practices have been known as "painting with light". However, as the movement and support of the shielded light is manual it is not possible to produce even illumination upon the subject, and if the subject has a light reflective surface the light will be reflected therefrom causing white streaks across the photograph rendering the photograph unacceptable for most purposes.

When photographing subjects having light reflective surfaces the reflection from such surfaces of the illumination lamps is always a problem, and it is usually necessary to use diffused or indirect light to avoid undesirable highlighting, although highlighting is often desirable to emphasize the configuration and appearance of the subject.

It is known to support photographic illumination lamps for adjustable purposes, such as shown in U.S. Pat. No. 3,378,678, and it is also known to modify and enhance photographic negatives at predetermined locations due to over or underexposure by employing "dodging" techniques such as shown in U.S. Pat. Nos. 2,860,561 and 3,158,478. However, in the prior art methods and apparatus have not been disclosed which achieve the results of the invention due to the controlled movement of a uniform light source, and in the practice of the invention results are achieved not heretofore suggested or taught by others.

It is an object of the invention to provide a method for illuminating a subject to be photographed wherein a uniform highlighting of subject matter having a reflective surface is possible.

Another object of the invention is to provide a method for illuminating a subject being photographed wherein a substantially uniform illumination of the subject throughout the exposed subject surfaces can be achieved with a single light source and shadows and underexposed areas substantially illuminated.

Another object of the invention is to provide a method for illuminating subject matter to be photographed wherein the subject background may be modified in its contrast to the subject, and if desired, the background may be completely obliterated from the photograph.

Another object of the invention is to provide apparatus for illuminating a subject to be photographed wherein an illuminating source is mounted for displacement at a predetermined rate relative to the subject whereby various surfaces of the subject will be illuminated from various directions during the photographing procedure.

Yet another object of the invention is to provide apparatus for illuminating the subject to be photographed utilizing a light source emitting a uniform intensity of light through a vertical dimension greater than the vertical dimension of the subject being photographed wherein a uniform highlighting of the subject is achieved.

An additional object of the invention is to provide illumination apparatus for illuminating a subject being photographed wherein a uniform light source of a vertical dimension greater than the subject matter being photographed is mounted upon a portable support capable of translating the light source at a predetermined and uniform rate of movement relative to the subject.

In the practice of the invention a uniform source of light which has a vertical dimension greater than the vertical dimension of the subject being photographed is mounted for movement at a predetermined uniform rate relative to the subject. The source of illumination comprises an elongated light source, such as a reflector or tube of light, such as a fluorescent tube, and although the light source is relatively narrow in its horizontal dimension its height is usually several feet, and in some instances in excess of fifteen feet.

In one embodiment, the light source is suspended from a ceiling-mounted, motor-driven support wherein the light source is capable of rotating in a complete circle about the subject being photographed. During photographing, the aperture of the lens remains open at a predetermined exposure opening, and the light source is passed across the subject between the subject and camera while being shielded from the camera. The light source is translated at a uniform predetermined rate, and as the light source is moved the subject is uniformly illuminated across those surfaces disposed toward the camera, and shadows and underexposed areas on the subject are substantially reduced. By correlating the aperture opening with the intensity of the light and the rate of movement of the light source, a photograph of superior quality is produced.

As the light source has a vertical dimension greater than the vertical dimension of the subject being photographed, and as the light source is uniformly moving during film exposure, a highlight on the subject is produced throughout the height and width of the subject. If the subject contains light reflective surfaces and if objectionable overexposure occurs at a few locations, the aperture of the lens can be reduced while the light passes those locations.

If it is desired to modify the background behind the subject, the light source is displaced behind the subject at its uniform rate of movement, and as the vertical dimension of the light source is greater than that of the subject, and as the light source travels the entire horizontal field of the film image, the film will be exposed to the light directly emitting from the light source as it travels across the background. This direct exposure of the light source to the film negative exposes the film negative except for that portion directly behind the subject. Accordingly, a "wall of light" is disposed behind the subject during photographing and the contrast of the background with respect to the subject may be closely controlled. For instance, the background may only be "washed" so that the background only appears in a light form, or, it is possible to completely obliterate the background wherein the background appears as a white wall and a sharp delineation exists between the white background and the edges of the subject In another embodiment of the invention the light source is mounted upon a portable carrier in the form of a small cart which is driven by an electric motor at a uniform rate of movement. The cart supports batteries which, in addition to driving the cart, energize the elongated illumination source which mounts upon the cart and extends thereabove. The cart is steerable, and, if desired, could be steered by remote control upon remote control apparatus being drivingly associated with the steering wheel.

The portable illumination apparatus is used when photographing large subjects, such as machine tools, vehicles, or the like, and the vertical height of the light source is greater than the height of the subject being photographed. As the light source as mounted upon the cart is capable of circumscribing the subject, the subject will be illuminated on the sides exposed to the camera, and as the light source and cart pass across the rear of the subject the background can be modified as desired, and in many cases entirely obliterated to produce a white background. Thus, when photographing the subject in a factory or the like wherein the background is objectionable, the use of the invention permits the background to be completely masked out merely by passing the light source behind the subject. With conventional methods of photography, a white backdrop would have to be disposed behind the subject to produce a comparable effect, and the installation of such a backdrop, or retouching of the photography would be required, and in the use of the invention substantial cost savings are experienced.

BRIEF DESCRIPTION OF THE DRAWINGS

The aforementioned objects and advantages of the invention will be appreciated from the following description and accompanying drawings wherein:

FIG. 5 is an elevational view of another embodiment of the invention wherein the light source is mounted upon a cart, illustrating the left side of the apparatus, FIG. 6 is a rear elevational view of the apparatus of FIG. 5, FIG. 7 is a rear elevational view of apparatus in accord with the invention illustrating the upper portion of the light source being angularly disposed to the light source lower portion, FIG. 8 is a plan, sectional view of the apparatus shown in FIG. 5 taken along Section VIII—VIII, FIG. 9 is a bottom plan view of the cart apparatus of FIGS. 5–7, and FIG. 10 is a sectional plan view taken through the light source and supporting bracket along Section X—X of FIG. 5.

DESCRIPTION OF THE PREFERRED EMBODIMENT

Figure 1:
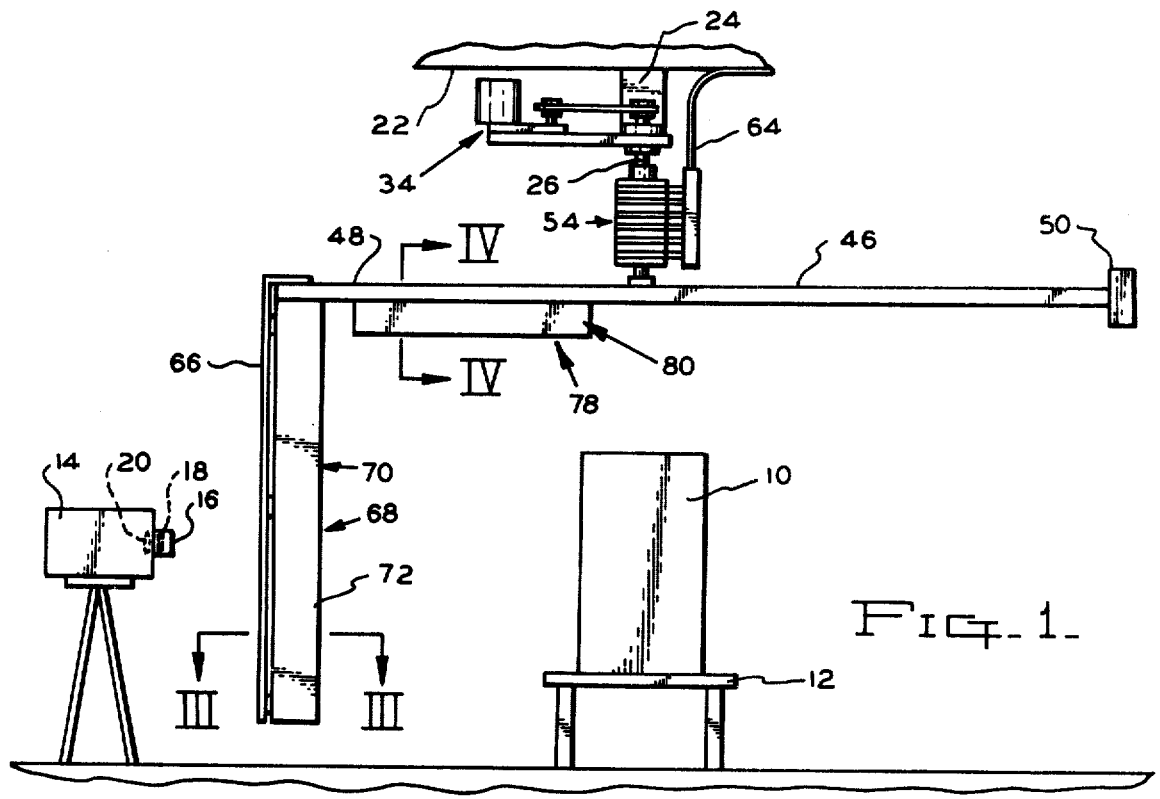
FIG. 1 is an elevational view illustrating the basic apparatus utilized in the practice of the method of the invention wherein the light source is suspended from a ceiling mounted support.
Figure 2:
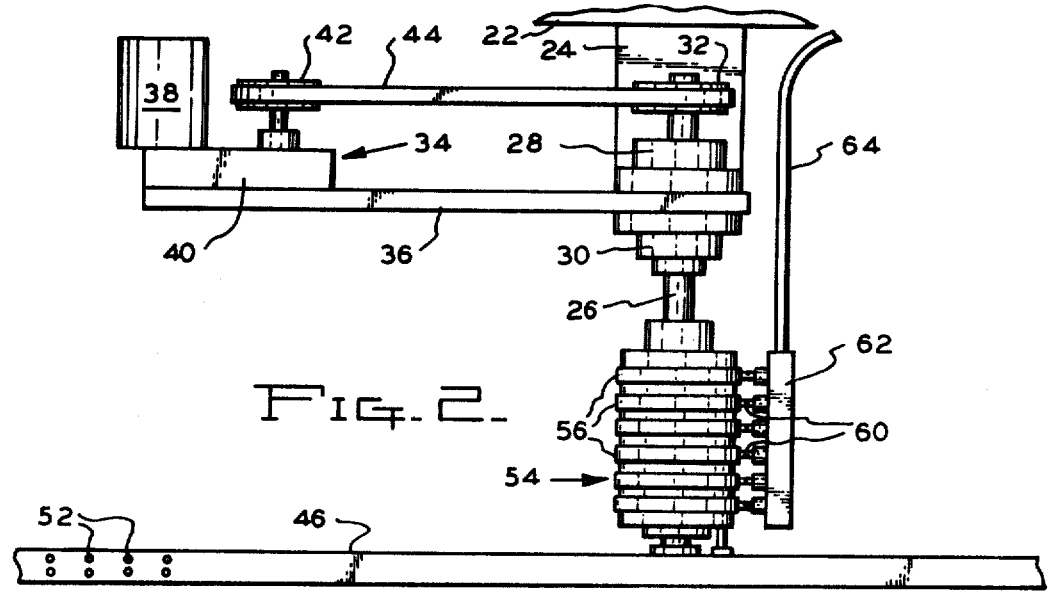
FIG. 2 is an enlarged, elevational, detail view of the light source support.
Figure 3:
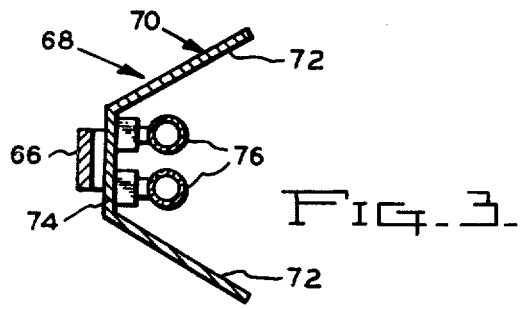
FIG. 3 is a plan, sectional view taken through the light source along Section III—III of FIG. 1.
Figure 4:
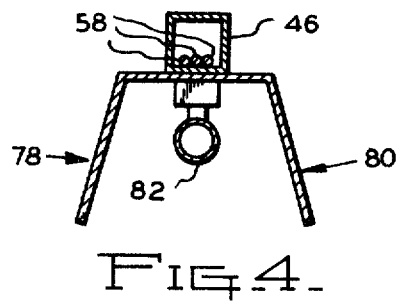
FIG. 4 is an elevational, sectional view taken through the auxiliary light source along Section IV—IV of FIG. 1.

In FIG. 1 the basic relationship between components required to practice the method of the invention is shown. The subject being photographed is schematically indicated at 10, and is supported upon a table 12. Of course, the subject being photographed may be any object, and has a known vertical dimension as will be appreciated from FIG. 1. The camera 14 is mounted upon a tripod and includes a lens 16, and the usual shutter 18 and aperture 20 whereby the light entering the camera is controlled by these components in the usual manner.

The illumination apparatus shown in FIGS. 1–4 is used when photographing subjects of smaller dimension than those that require the cart mounted light source of FIGS. 5–10, and the illumination apparatus of FIGS. 1–4 is suspended from a ceiling 22 or ceiling support beam, and includes a bracket 24 affixed to the ceiling by conventional fasteners. The bracket 24 serves as the support for a vertically oriented shaft 26 rotatably mounted upon the bracket by bearings 28 and 30, FIG. 2. The upper end of the shaft 26 is provided with a belt drive pulley 32, and an electric motor drive assembly 34 is mounted upon the bracket supported extension plate 36. The drive motor assembly 34 includes an electric motor 38 driving a step-down transmission 40 having an output shaft upon which pulley 42 is mounted. Belt 44 interconnects pulleys 32 and 42 wherein energizing of the electric motor 38 slowly rotates the shaft 26 at a uniform and predetermined rate of revolution.

A horizontal beam 46 is mounted upon the lower end of the shaft 26, and as will be appreciated from FIG. 1, the beam includes an end region 48, and an opposite end region upon which a counterweight 50 may be mounted. The beam includes a plurality of mounting holes 52, FIG. 2, defined thereon whereby illumination apparatus may be selectively mounted thereto.

A slip ring assembly 54 is mounted upon the lower portion of the shaft 26 including a plurality of slip rings 56 which are connected with conductors 58 located within the beam 46 and are electrically connected to the lamps of the light sources mounted on the beam, as later described. The slip rings 56 are each engaged by a brush 60 electrically connected to conductors within the housing 62 whereby the brushes are connected to the electrical supply conductor 64.

A lamp bracket 66 is mounted upon the beam end 48 and extends downwardly therefrom. The bracket 66 includes a lower end disposed adjacent to the floor, and serves as the support for the light source generally indicated at 68. The light source 68 includes a reflector 70, generally of a V-configuration having angularly disposed sides 72, and a base 74. The inside surfaces of sides 72 may be painted white, or could include a reflective material. The lamps 76, two of which are used, comprise fluorescent tubes mounted upon conventional lamp base structure at their ends, and the tubes 76 extend the entire length of the reflector 70. Thus, it will be appreciated that a uniform source of light exists throughout the vertical dimension of the light source 68.

In order to insure that a highlight of localized character does not appear upon a reflective surface of the subject 10, the vertical dimension of the reflector 70 and lamps 76 is greater than the vertical dimension of the subject 10 being photographed. Thus, the light being cast upon the subject by the tubes 76 and reflector 70 will be substantially uniform throughout the subject height, and as the light source 68 rotates about the subject an even illumination across the front and lateral sides of the subject relative to the position of the camera will be achieved.

In order to further improve the illumination of the subject being photographed, a secondary light source 78 may be mounted upon the beam 46 adjacent the end region 48. This light source includes an elongated reflector 80, FIG. 4, mounted to the underside of the beam 46, and the inside of the reflector is white, or is lined with a light reflective material. A fluorescent tube 82 is mounted within the reflector 80, extending the length thereof, and is mounted upon end support terminals. The light source 78 will cast light downwardly upon the subject 10 and due to its downward light direction the subject will further be illuminated for the removal of unwanted shadows.

In use, the aperture 20 and lens 16 of the camera 14 are adjusted with respect to the amount of light that will be cast upon the subject during photographing. The motor 38 will be energized to locate the beam 46 and primary light source 68 at approximately 90° to a line between the camera and the subject 10. The camera shutter 18 is opened, the motor 38 is energized to cause the shaft 26, beam 46 and light source 68 to rotate in a direction toward the camera 14. Of course, this movement of the light source 68 will interpose the reflector 70 between the camera 14 and the subject 10 for a short time, but the light source structure will not appear in the photograph due to its movement while the camera aperture is open. During this movement of light source the reflector sides 72 will prevent light from the lamps 76 being directly exposed to the camera, and the light entering the camera will be that reflected from the subject 10.

The motor 38 will usually remain energized until the light source 68 has traversed approximately 180°. Thus, the subject 10 will have been illuminated upon the front side and both lateral sides, and as the light source travels through its path at its predetermined rate of movement the subject will have been illuminated uniformly on all sides exposed to the camera and shadows and under-illuminated areas substantially eliminated, even with a subject having a complex configuration. The light source 78 further illuminates the subject at the front and lateral sides, as well as the top, and aids in the production of a photograph substantially free of undesirable shadows.

If it is desired to modify or mask out the background behind the subject 10 the motor 38 is continued in operation such that the light source 68 will transcribe a complete circle about the subject. As the light source 68 passes "behind" the subject 10 the camera will be directly exposed to the light from lamps 76 causing the film to be overexposed in those areas which are not shielded or masked out by the subject. The extent of masking of the background will be determined by the setting of the aperture 20 within the camera, and a "transparent" background can be produced, and if it is desired that an entirely white background be produced sufficient light may enter the camera to result in an opaque "wall of light" in the background of the subject as it appears on the film.

After the light source 68 has transcribed a complete circle the camera shutter 18 is closed, and the motor 38 is deenergized.

During the aforementioned movement of the beam 46 and light source 68 the light source 78 will illuminate the upper portion of the subject, but as the light source 78 is not directly within the view of the camera when it is disposed behind the subject 10 the light source 78 will not appear upon the film image or affect the masking of the background.

The rate of movement of the light source 68 about the subject 10 is constant, and by experience, calculation, and trial and error, the photographer will be able to determine the camera aperture settings and other factors necessary to achieve an excellent photograph.

As the vertical height of the light source 68 is considerably greater than the vertical height of the subject 10, and as the illumination intensity is uniform throughout the vertical height of the light source 68 consistent results can be obtained by a photographer of ordinary skill with practice. If the surfaces of the subject 10 are reflective the highlight achieved by the length of the light source 68 enhances the appearance of the subject without producing objectional concentration of reflective light on the finished photograph, and in the practice of the invention superior depth perception and illumination of complex subjects is achieved.

The embodiment of the invention shown in FIGS. 5-10 permits the concepts of the invention to be practiced when photographing a subject too large, or heavy, to be located within the previously described apparatus. In this embodiment the illumination means is mounted upon a small cart, as to be portable, and the cart is driven by an electric motor at a uniform rate of movement to produce the necessary timing and control.

The vehicle or cart 84 includes a platform which is supported upon a rear axle 86 upon which rear wheels 88 are mounted. A single front wheel 90 is also located below the platform for pivotal movement about a vertical axis and is connected to a steering handle 92 extending upwardly and forwardly of the cart. The steerable wheel 90 is driven by an electric motor 94 suitably geared down through transmission 96, FIG. 9, wherein energization of the motor 94 will propel the cart 84 at the desired uniform rate of movement.

The cart 84 supports a plurality of electric storage batteries 98, five shown in the described embodiment, and a switchboard 100 supports switches 102 which connect the batteries to the lamps and motor 94 by appropriate conductors. The cart platform is provided with a V notch 104, and a bracket 106 fixed to the cart platform in alignment with the V notch supports the illustrated light source 108.

The light source 108 comprises an elongated reflector 110 of a V-configuration wherein the sides 112 of the reflector are white, or formed of a light diffusing reflective material. The lower end of the reflector 110 is supported by the bracket 106, and an elongated bracket bar 114 attached to the cart platform comprises the primary support for the reflector. The reflector 110 may be of a single piece, but is preferably formed of several sections for adjustment, handling and storage purposes.

The reflector sides 112 are illuminated by an elongated lamp support 116 supported at its lower end by the bracket 106, and its upper end by the bar 114. The lamp support reflector 116 also constitutes a V-shaped reflector, and a translucent panel 118 is preferably mounted upon the reflector 116 to diffuse the light passing therethrough. A plurality of quartz lamps 120 are mounted upon the lamp support base 122 mounted within the reflector 116 at evenly spaced locations thereon, and these lamps are energized by the batteries 98. The spacing of the lamps 120, and the diffusion produced by the panel 118, causes a substantially uniform light to be cast upon the reflective surfaces of reflector sides 112, and accordingly, the reflector sides 112 will be substantially uniformly illuminated to emit a uniform light throughout the height of the reflector 110.

In use, the apparatus of FIGS. 5–10 is employed in a manner similar to that of the previously described embodiment of FIGS. 1–4. The cart 84 and associated light source 108 are located at a lateral side of the subject to be photographed, and the cart motor 94 is energized to translate the cart and light source across a lateral side, front and other lateral side of the subject being photographed, the cart normally passing between the subject and the camera while the camera aperture is open. If it is desired to mask out the background behind the subject the cart will be steered to pass behind the subject exposing the film directly to the light reflected by the reflector 110 not masked by the subject to form a "wall of light" behind the subject. Depending upon the setting of the camera aperture the degree of contrast of the existing background will be varied, and the wall of light background may be transparent to dimly reveal the background, or the background may be completely obliterated if the camera aperture is open to a greater extent.

As before, the vertical dimension of the reflector 110 is greater than the vertical dimension of the subject being photographed, and the utilization of the uniform source of light will eliminate any adverse highlight aspects in the finished photograph. The uniform light produced by the light source 108 will have a vertical dimension greater than that of the subject and will extend above the desired highest background elevation to be photographed, and within the camera range, and the "wall of light" behind the subject will be uniform throughout its height.

In FIG. 7 the light source 108 is illustrated in an optional manner whereby the upper section 124 of reflector 110 is located at right angles to the lower reflector section 126. In this manner a downwardly directed illumination is produced in a manner similar to that shown in the embodiment of FIGS. 1–4, and this arrangement of the light source 108 is utilized wherein the full height of the reflector as shown in FIGS. 5 and 6 is not required, and additional illumination is desired in the upper regions of the subject.

In the embodiment of FIGS. 5–10 quartz lamps 120 are illustrated as producing the light for illuminating the reflector 110. However, it is to be understood that fluorescent tubes such as those shown in FIG. 3 could also be employed with this embodiment, and in such instance the reflector 116 would not be required, but the structure would be similar to that shown in FIG. 3.

It will therefore be appreciated that the concept of the invention utilizes a uniform source of illumination having a vertical dimension greater than that of the subject being photographed which eliminates adverse highlighting as results from illumination means having a single or concentrated source of light. The movement of the light source while the camera aperture is open permits the subject to be uniformly lighted while only requiring a single light source, and by utilizing the uniform light source of the inventive concept it is possible to control the background to form a "wall of light" which may have various degrees of transparency, if desired, or comprise a white background of an opaque nature.

The practice of the invention, and the use of the apparatus disclosed, substantially reduces the amount of lighting equipment and photographic apparatus required to produce comparable quality photographs. The "set up" time when using the apparatus of the invention is substantially reduced over conventional photographic setups in that a plurality of lights are not required, and if it is desired to mask out, or lower the contrast of the background, the practice of the invention permits such an effect with very little extra time or cost involved. With conventional apparatus the masking of the background requires complicated darkroom techniques, or requires that a backdrop be located behind the subject, which is expensive and difficult when photographing large subjects. Otherwise, retouching of the photograph is needed.

It will be appreciated that various modifications to the inventive concepts may be apparent to those skilled in the art without departing from the spirit and scope of the invention.

I claim:

1. The method of lighting a subject being photographed to produce a uniform highlight upon the subject across the width thereof to improve contrast and depth perception wherein the camera includes an aperture and lens controlling the amount of light entering the camera, the subject including front, rear and lateral sides with respect to the camera location, comprising the steps of opening the camera aperture to a predetermined opening, illuminating the subject from a substantially uniform vertically oriented light source having a vertical dimension greater than the vertical dimension of the subject, and translating said light source across the front and lateral sides of the subject at a predetermined rate of movement to illuminate the subject at said front and lateral sides.

2. In a method of lighting a subject being photographed as in claim 1 including the step of translating the light source across the rear of the subject at a predetermined rate of movement whereby the film is directly exposed to the light source not masked by the subject and the background at the rear of the subject is modified on the film image due to exposure from the light source.

3. The method of lighting a subject being photographed to modify the background wherein the camera includes an aperture and lens controlling the amount of light entering the camera, the subject including front, rear and lateral sides with respect to the camera position, comprising the step of opening the camera aperture to a predetermined setting controlling the amount of light entering the camera, and passing a uniform source of light having a vertical dimension greater than the vertical dimension of the subject at a predetermined rate of movement behind the subject to expose the film to the light source, the setting of the camera aperture determining the brightness of the background.

4. The method of lighting a subject being photographed as in claim 3 including the additional step of passing the uniform source of light about the subject lateral and front sides to illuminate the lateral and front sides for photographic purposes at said predetermined rate of movement.

5. Apparatus for illuminating a subject to be photographed comprising, in combination, an elongated light source having a height greater than the vertical height of the subject to be photographed having a substantially uniform light intensity output throughout its height and means for supporting said light source for translating said light source in a horizontal direction at a predetermined rate of movement relative to the subject being photographed.

6. Apparatus for illuminating a subject to be photographed as in claim 5 wherein said means for supporting said light source includes a light source support, means for movably mounting said light source support, and motor means operatively connected to said support for moving said support at said predetermined rate of movement.

7. Apparatus for illuminating a subject to be photographed as in claim 6 wherein said light source support includes a vertical shaft having upper and lower ends, bearings rotatably supporting said shaft, a substantially horizontal beam mounted upon said shaft lower end, said light source including an elongated vertically oriented lamp bracket mounted upon said beam, lamp means mounted upon said bracket, and drive means connecting said motor means to said shaft for rotating said shaft, beam and lamp bracket.

8. Apparatus for illuminating a subject to be photographed as in claim 7, an electric slip ring assembly mounted upon said shaft electrically connected to said lamp means, and electrical supply conductors operatively connected to and supplying electric power to said slip ring assembly.

9. Apparatus for illuminating a subject to be photographed as in claim 5 wherein said means for supporting said light source comprises a wheeled vehicle, said vehicle including light source supporting means, a steerable wheel and at least one drive wheel, and an electric motor drivingly connected to said drive wheel for translating said vehicle and light source at said predetermined rate of movement.

10. Apparatus for illuminating a subject to be photographed as in claim 9, battery means mounted upon said vehicle, first conductor and switch means selectively connecting said battery means to said light source, and second conductor and switch means selectively connecting said battery means to said electric motor.

11. Apparatus for illuminating a subject to be photographed as in claim 10, wherein said light source includes an elongated reflector, electric lamp means disposed adjacent said reflector and an elongated bracket mounted upon said vehicle supporting said reflector and lamp means.

* * * * *